Feb. 25, 1936.    J. L. GRAY    2,031,884
SHORT WAVE SOUND SYSTEM FOR VISUALLY OBSERVING
Filed Sept. 8, 1930    3 Sheets-Sheet 1

Inventor
Jesse L. Gray
By
Jack A. Schley
Attorney

Feb. 25, 1936. J. L. GRAY 2,031,884
SHORT WAVE SOUND SYSTEM FOR VISUALLY OBSERVING
Filed Sept. 8, 1930  3 Sheets-Sheet 2

Inventor
Jesse L. Gray
By
Jack A. Schley
Attorney

Feb. 25, 1936.  J. L. GRAY  2,031,884
SHORT WAVE SOUND SYSTEM FOR VISUALLY OBSERVING
Filed Sept. 8, 1930  3 Sheets-Sheet 3
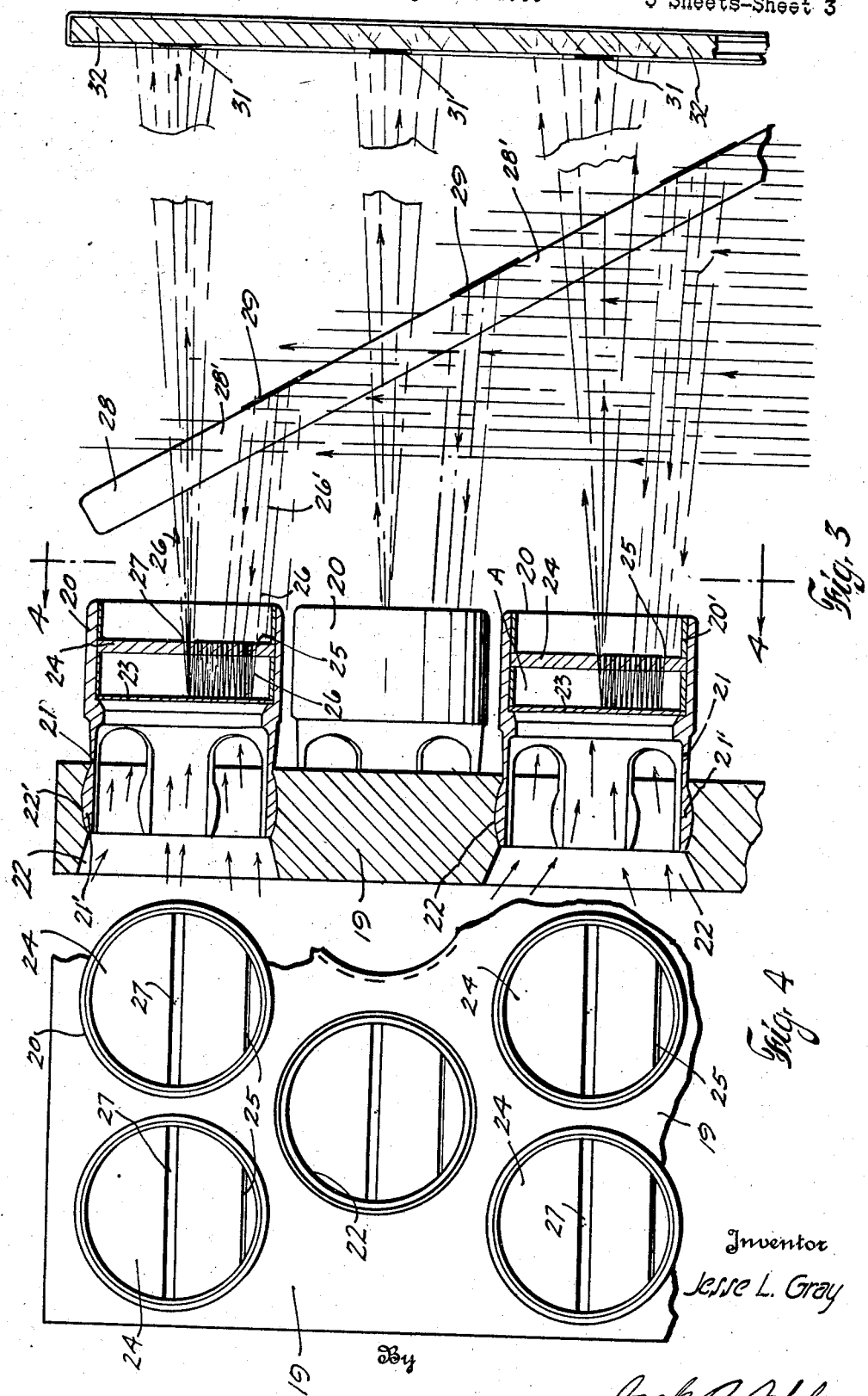
Inventor
Jesse L. Gray
By
Jack A. Ashley
Attorney Patented Feb. 25, 1936

2,031,884

UNITED STATES PATENT OFFICE 2,031,884

SHORT WAVE SOUND SYSTEM FOR VISUALLY OBSERVING

Jesse L. Gray, Dallas, Tex.

Application September 8, 1930, Serial No. 480,373

7 Claims. (Cl. 250—1)

This invention relates to new and useful improvements in telescopic apparatuses.

One object of the invention is to provide means for visibly observing through the medium of short wave sound vibrations, objects which are obscured to the normal vision by obstructions such as clouds, fogs, smoke, partial or total darkness, foliage or the like.

Another object of the invention is to provide means for observing the ground from air-planes during cloudy, foggy and stormy weather, or at night whereby the dangers of flying under such adverse conditions are clearly diminished.

A further object of the invention is to provide means for visibly penetrating smoke screens and the like, whereby objects behind such vision obstructions may be observed.

A particular object of the invention is to provide means for visibly penetrating fog, smoke, darkness or the like whereby shipping by boats, air-plane flying, fire fighting, etc., may be successfully undertaken with less danger than heretofore experienced.

An important object of the invention is to provide means for transposing sound vibrations of a desired frequency and variable intensities into light rays having variable deviations of travel whereby said light rays will produce portions of a visible picture according to their deviations, thus producing a coarse half-tone picture.

A construction designed to carry out the invention will be hereinafter described together with other features of the invention.

Figure 1:
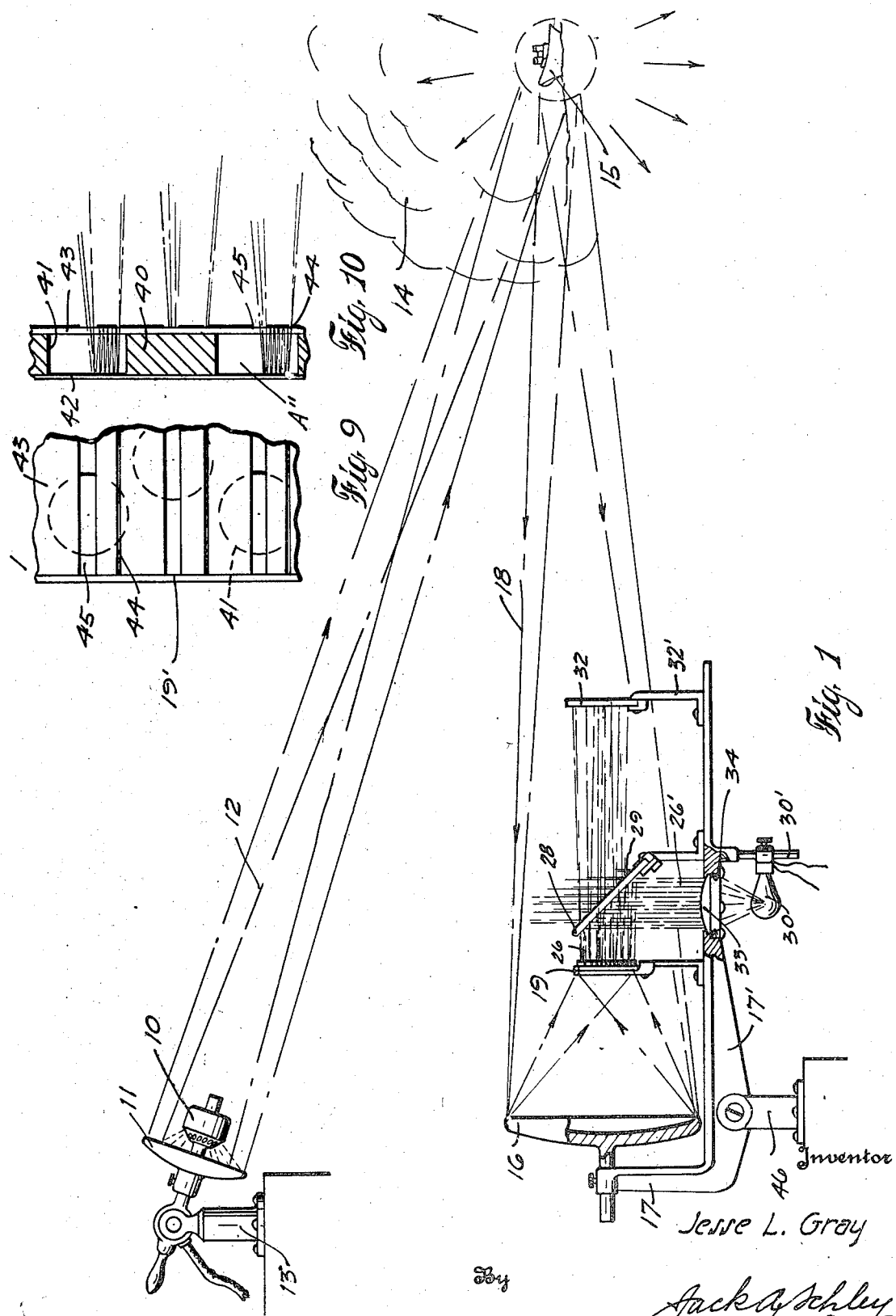
Figure 2:
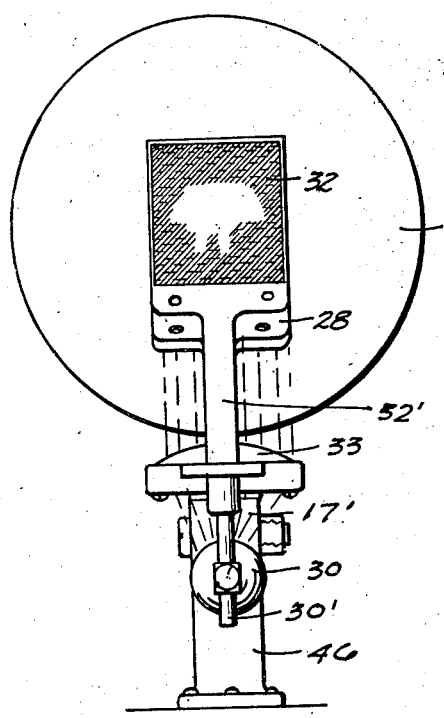
Figure 5:
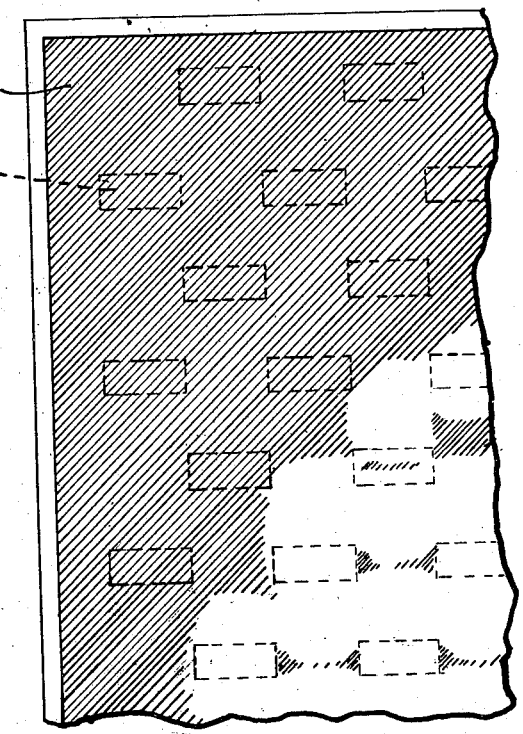
Figure 7:
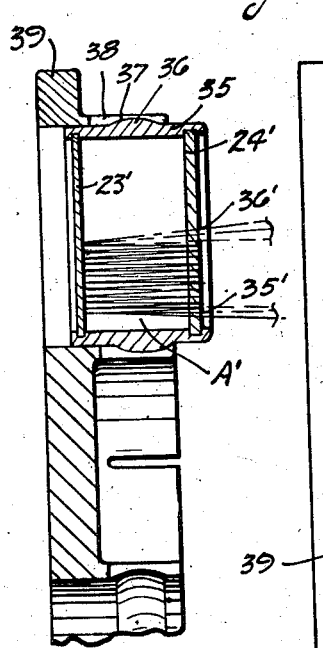
Figure 6:
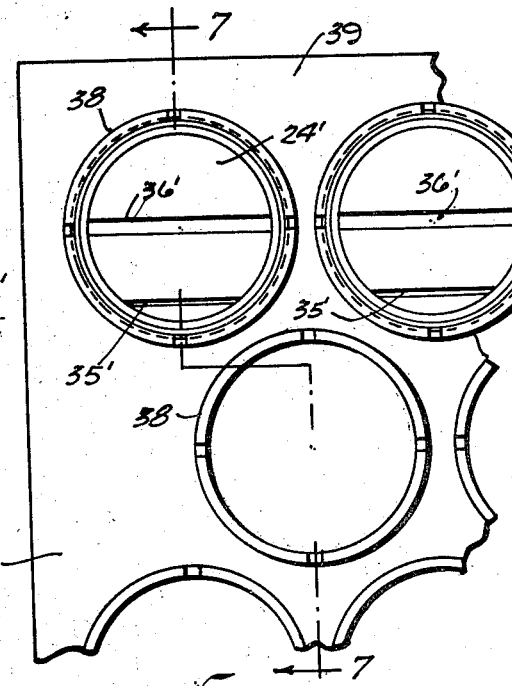
Figure 8:
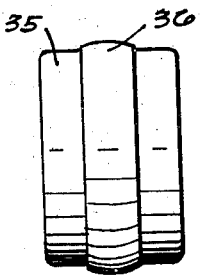

The invention will be more readily understood from a reading of the following specification and by reference to the accompanying drawings in which an example of the invention is shown, and wherein:

Figure 1 is a side elevation of a device constructed in accordance with the invention, Figure 2 is an end view of the receiver and transpositor showing the visible image screen, Figure 3 is an enlarged sectional view of the transpositor, Figure 4 is a sectional view taken on the line 4—4 of Figure 3, Figure 5 is an enlarged sectional view of the visible image screen showing the variable deviations of light rays, Figures 6, 7 and 8 are detail views of a modified form of light controlling cells, and Figures 9 and 10 are detail views of another form of light controlling cells.

In the drawings the numeral 10 designates any suitable high pitch or short wave sound generator having an adjustable focusing projector 11 for directing sound waves 12 which are emitted from said generator. The generator and the projector are provided with a universal support 13 whereby the sound waves 12 may be focused in any desired direction to penetrate a fog bank 14 or other adverse normal vision conditions through which sound waves will travel to strike an object 15 such as a ship.

A sound receiver 16 adjustably mounted on the upright arm 17 of the supporting frame 17' is positioned for receiving the sound waves 18 which are deflected from the object 15. The sound waves 18 are focused by the receiver to strike a light controlling panel 19 which is mounted on the frame 17'. As best shown in Figures 3 and 4, the panel is composed of a plurality of cells 20 which are adjustably and replacably mounted by spring fingers 21 in apertures 22 in said panel. The apertures are positioned in close staggered relation in the panel. The spring fingers 21 of each cell are formed with spherical bosses 21' at their outer ends for seating in an annular spherical groove 22' within the aperture 22 whereby the axial alinement of these cells may be adjusted in relation to the panel as desired.

Each cell 20 consists of a tubular housing 20' in which a reflecting diaphragm 23 and a mirror 24 are mounted in oposite ends of said housing thereby forming a resonant chamber A within said housing. The diaphragm and the mirror are positioned with their reflecting surfaces parallel and facing each other. The diaphragm may be made of any suitable reflecting material of high tensile strength, such as thin silvered glass, thin polished sheet metal or foil, thin plated metal or foil and the like.

The mirror 24 is provided with a narrow transparent strip 25 at the bottom thereof for admitting a narrow beam of light 26 into the chamber A; also a transparent strip 27 provided at the center of the mirror is of sufficient width to emit the light beam 26 from the cell, even when said beam is strongly deflected. A suitable reflector 28 such as a mirror having staggered reflecting strips 29 is mounted at an inclination to the panel 19 whereby the light rays 26 are deflected at an inclination to the axis of the cell to the strips 25, from a suitable light source such as an incandescent lamp 30.

A plano-convex lens 33 is mounted in an aperture 34 in the supporting frame 17' above the lamp 30 for projecting the light rays 26 in parallelism from the lamp 30 so as to strike the reflecting strips 29 at the same angle. The lamp 30 is adjustably mounted on a rod 30' which depends from the frame 17'.

The reflector 28 is provided with transparent portions 28' between the reflecting strips so that the light rays 26 may pass from the cells to a screen 32. This reflector may be made from an ordinary silvered glass mirror with the portions 28' of the glass having the silvering removed. The light beams 26 entering the chamber A at an angle will reflect back and forth at an inclination between the diaphragms and the mirrors until the beams reach the transparent strips 27 and pass therethrough.

It is pointed out that all of the reflections of the beams 26 from the diaphragm take place between the edge and the center of said diaphragms as the angles of deflection increase toward the center of said diaphragms when the same are vibrated. For this reason the slightest actuation of the diaphragm will cause a large deflection in the path of the beams 26 emitting from the cells, thus giving the diaphragms a sensitive control of the light beams.

The resonant chambers A are of such length as to cause the diaphragm to vibrate resonantly with a predetermined frequency of sound vibration which the device is set to receive, whereby weak sound vibrations of the predetermined frequency set up strength vibrations of the diaphragm while sound vibrations of other frequencies will not effect said diaphragms.

As the reflecting strips 29 of the reflector 28 are considerably wider than the strips 25, the light beams 26 are of sufficient width to permit variable adjustment of the cells or the reflector 28, whereby the undeviated light beams 26 emitting from the cells may be directed through the portions 28' of the reflector 28 to strike blind or opaque areas 31 on the visible image screen 32, whereby these undeviated light beams will not show or be seen from the opposite side of said screen. This screen 32 may be of any suitable translucent material such as ground glass or the like or may be made of clear glass when a lens is used for reducing the image, as hereinafter set forth with the opaque sections 31 positioned thereon opposite the cells 20 for receiving and absorbing the normal undeviated light beams 26. The opaque spots may also be put on a white screen to absorb the quiet beam and allow the vibrating beam to light up the front surface of the screen at each side of the opaque spots, or slits in the white screen could replace the opaque spots and allow the light from the quiet beam to pass through and be lost. The screen is secured in a supporting frame 32' which is mounted on the outer end of the frame 17'.

When the diaphragms 23 are vibrated the light beams 26 are deflected and spread, as shown in Figures 3 and 5, upon the screen beyond the borders of the opaque sections 31. These deflected light beams upon striking the screen are diffused in proportion to their deflections and when the beams are strongly deflected the diffusion in the screen is sufficient to practically blot out the dark areas 31' in front of the opaque sections 31.

The frame 17' is provided with a universal support 46 so that the sound receiver and its relative transposition elements may be faced in any desired direction for receiving the sound vibrations 18.

In operation the short wave sound vibrations of equal intensities are projected from the sound generator 10. These sound vibrations upon striking an object such as a ship 15 are deflected in various intensities and some are received and focused onto the light controlling panel 19 and likewise the cells 20. The various intensities of sound vibration will strike the cells 20 in positions relative to their positions of deflection from the object, whereby the positions of the various intensities of illumination on the visible image screen 32 are likewise relative to the positions of sound deflections from the object, thereby producing a visible coarse half-tone picture of said object. If a sharper and clearer picture is desired, various suitable means such as a camera arrangement may be employed for reducing the picture.

In Figures 6, 7, 8, 9 and 10, I show two modified forms of cell structure and mounting. In Figures 6, 7 and 8 the cell is composed of a tubular housing 35 having an annular rim 36. This rim is provided with a spherical surface for seating in an annular spherical groove 37 formed within spring arms 38 which extend from a supporting frame 39, whereby the axial alinement of each cell may be adjusted in relation to said frame. A reflecting diaphragm 23' and a mirror 24' having transparent strips 35' and 36' are suitably mounted in opposite ends of each cell to form a resonant chamber A' therein.

In Figures 9 and 10 the cells are made integral with each other. A plate 40 is provided with a plurality of staggered apertures 41 and has a common reflecting diaphragm 42 cemented, clamped, or otherwise suitably secured to one side of the plate, while a common mirror 43 having transparent strips 44 and 45 for each aperture is likewise suitably secured to the opposite side of the plate. Resonant chambers A" are thus formed in the apertures between the common diaphragm and the common mirror. This structure provides a simple construction of light controlling panel 19', but the cells are not adjustable.

Various changes in the size and shape of the different parts, as well as modifications and alterations, may be made within the scope of the appended claims.

What I claim is:

1. The method of transposing sound vibrations into light ray vibrations which consists, in projecting sound waves onto an object, whereby said waves are deflected and modified in varying intensities according to the structure of the object, collecting some of the modified sound waves and focusing them onto sensitive vibratory reflecting elements relative to their position of reflection from the object, directing light rays onto said elements, whereby said light rays are reflected in vibrating light beams of varying degrees of vibration according to the varying sound intensities, and producing a coarse half tone picture from said vibrating light beams.

2. The method of transposing sound vibrations into a visible image which consists in projecting sound waves of a predetermined high frequency onto an object to be distorted and reflected thereby, collecting and focusing with relation to their position of deflection from said object, some of the distorted vibrations onto sensitive vibratory reflecting elements which only vibrate in response to the predetermined high frequency sound vibrations, directing light rays onto said vibrating elements to translate the sound wave variations into light beam vibrations, and producing a coarse half tone picture from said light beam vibrations.

3. The method of transposing sound vibrations with light rays which consists, in reflecting sound waves onto an object whereby said waves are distorted, collecting some of the distorted sound waves, reflecting said collected sound waves and translating them into light ray variations relative to their position of reflection from the object and projecting said light ray variations on a screen to produce a coarse half tone picture of the object.

4. In a telescopic apparatus, means for projecting sound waves onto an object whereby said waves will be deflected in varying intensities according to the object, means for translating sound wave vibrations relative to their position of reflection from the object into light ray vibrations, comprising means for collecting some of the deflected sound waves and reflecting them upon the translating means, means directing light rays upon the translating means, and a screen upon which light rays are projected from the translating means, whereby a coarse half tone picture of the object is produced.

5. In a telescopic apparatus, means for projecting sound waves onto an object whereby said waves will be deflected in varying intensities according to the object, means for translating sound vibrations relative to their position of reflection from the object into light ray vibrations comprising diaphragms and reflectors, means for collecting some of the deflected sound waves and focusing them upon the diaphragms of the translating means, a screen correlated with the translating means, and means for directing light rays upon the translating means, whereby said rays are vibrated and reflected on said screen to produce a coarse half tone picture of said object.

6. In a telescopic apparatus, means for projecting sound waves onto an object, whereby said waves will be deflected in varying intensities according to said object, means for translating said sound vibrations relative to their position of reflection from the object into light ray vibrations comprising diaphragms and reflectors, means for collecting some of the deflected sound waves and focusing them upon the diaphragms of the translating means, a screen correlated with the translating means, a source of light rays, and a condensing lens for projecting the light rays and condensing the same for focusing upon the translating means, whereby said rays are vibrated and reflected on said screen to produce a coarse half tone picture of said object.

7. In a telescopic apparatus, a siren for projecting high pitch sound waves, a concaved deflector for directing said sound waves upon an object whereby said waves will be deflected in varying intensities according to the object, means for translating said sound wave variations relative to their position of reflection from the object into light ray variations comprising reflecting diaphragms and reflectors co-acting therewith having light passages therethrough, a concaved receiver for receiving said sound wave variations and focusing the same on the translating means, a screen correlated with the translating means and having alternate opaque and light areas, a source of light, and means for directing rays of light from said source onto the translating means.

JESSE L. GRAY.